(12) United States Patent
Takagi et al.

(10) Patent No.: US 7,648,033 B2
(45) Date of Patent: Jan. 19, 2010

(54) METHOD OF PRODUCING PARTICLE-DISPERSED LIQUID

(75) Inventors: Seiichi Takagi, Kanagawa (JP); Tetsuo Ohta, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 450 days.

(21) Appl. No.: 11/236,824

(22) Filed: Sep. 28, 2005

(65) Prior Publication Data

US 2007/0007220 A1    Jan. 11, 2007

(30) Foreign Application Priority Data

Jun. 24, 2005 (JP) .............................. 2005-184518

(51) Int. Cl.
  *B03B 5/00* (2006.01)
  *B03B 5/62* (2006.01)
  *B07B 13/00* (2006.01)
  *B07C 5/12* (2006.01)

(52) U.S. Cl. .................. 209/155; 209/208; 209/659

(58) Field of Classification Search ............... 209/659, 209/156, 155, 172, 172.5, 173, 208, 209, 209/210, 724, 725; 210/787
See application file for complete search history.

(56) References Cited

U.S. PATENT DOCUMENTS 5,076,943 A * 12/1991 Rakow .................... 210/808
5,089,126 A * 2/1992 Silebi et al. .............. 210/198.2
7,328,807 B2 * 2/2008 Takagi et al. ............. 209/172.5
2004/0213083 A1  10/2004 Fujiwara et al.
2007/0000814 A1 * 1/2007 Kennedy et al. ........... 209/210

FOREIGN PATENT DOCUMENTS

DE      40 17 709 A1   12/1991
EP       0 641 587 A2    3/1995
WO    WO 02/29400 A2    4/2002

OTHER PUBLICATIONS

Seki et al. "Development of a Method of ContinuouslyClassifying Fine Particles Using Micro-Channel Layer Flow System." *69th-year Collection of Manuscripts of the Academic Circle of the Chemical Engineering.* No. 201. 2004.
Ogawara et al. "Discussion of Behavior in a Micro-Separation Classification Apparatus by Euler-Lagrange Method." *69th-year Collection of Manuscripts of the Academic Circle of the Chemical Engineering.* No. 202. 2004.

* cited by examiner

*Primary Examiner*—Patrick H Mackey
*Assistant Examiner*—Mark Hageman
(74) *Attorney, Agent, or Firm*—Oliff & Berridge, PLC (57) ABSTRACT

A method of producing a particle-dispersed liquid, using a channel of micro width having a core flow channel, includes: sending the particle-dispersed liquid containing larger particles to an inner portion of the core flow channel; separating and removing the larger particles from the particle-dispersed liquid; and sending the removed larger particles to an outermost part of the core flow channel. An outer diameter of the core flow channel is 50 to 5,000 µm.

16 Claims, 5 Drawing Sheets

METHOD OF PRODUCING PARTICLE-DISPERSED LIQUID

BACKGROUND OF THE INVENTION

1. Field of the Invention

The present invention relates to a method of particle-dispersed liquid, and more particularly to a method of separating and removing larger particles and/or indeterminately shaped particles in a particle-dispersed liquid by using micro-flow passages. The invention further relates to an apparatus for producing particle-dispersed liquid, having micro-flow passages.

2. Description of the Related Art

The particle classification methods include a dry method and a wet method.

The dry methods include a high accuracy method since a difference between the specific gravity of a fluid and that of particles becomes large.

In the wet method, a difference between the specific gravity of a liquid and that of particles becomes small but particles are dispersed easily in a liquid, so that a high classification accuracy is obtained with respect to, especially, a powder region. Both the dry method and wet method having generally a rotating portion and adapted to classify particles on the basis of the balance of the centrifugal force and inertial force constitute the main methods. However, due to the provision of the rotating portion, there are problems of contamination of the apparatus due to the abrasion of the part and problems of the cleaning of the apparatus. In the dry method, a classifier not having a rotating portion and utilizing the "Coanda effect" has been commoditized but, in the wet method, an efficient classifier not having a rotating portion has not yet been obtained.

The methods of removing larger particles contained in particles include a method of removing the same by using a filter and the like having uniform pores. However, even in a batch type filter, the clogging thereof with contaminants and the like occurs. Therefore, such a filter has a low operational efficiency, and causes an increase in the diameter of the pores during a long use thereof, so that the accuracy lowers.

In the meantime, various kinds of methods and apparatuses for conducting a chemical reaction, a unit operation and the like in micro-regions have been studied in recent years, and methods and apparatuses for classifying particles efficiently without causing the contamination of the apparatus to occur have been discussed.

An Non-Patent Document 1 proposes a method of enabling the classification of particles in the direction perpendicular to the flows thereof to be done as the method of and the apparatus for classifying particles by only introducing particles, by using micro-channels (pinched channels) having partially narrowed portions and utilizing profiles of the characteristic flows in the micro-channels. In this method, it has been reported the separation of particles of 15 μm and particles of 30 μm from each other can be carried out.

In a Non-Patent Document 2, a method of separating and classifying particles by micro-channels having arcuate rectangular cross-sections is reported.

In the former method/apparatus, it is necessary that the width of a laminar flow be reduced to not larger than the particle size, and the method/apparatus has many problems in practical use thereof. In the latter method, an eddy current occurs, and particles of which the diameters are small are mixed in the flow in the outermost flow passage, so that the separation of particles (larger-diameter particles) only having larger particle sizes cannot be carried out.

Although it is also demanded that the separation of particles of higher degree of indeterminate shapes be made, there is not a method which has been put into practical use for this purpose.

The Patent Document 1 discloses an apparatus for mixing or separating a fluid capable of preventing reaction products from being deposited on a flow channel wall, and capable of being produced with a high efficiency. However, this apparatus/system, a method of separating larger-diameter particles only contained in a micron-order particle-dispersed liquid is not referred to. Especially, a method of efficiently separating indeterminately shaped particles only is not described either.

[Patent Document 1] US2004/0213083 A1

[Non-Patent Document 1] 69th-year Collection of Manuscripts of the Academic Circle of the Chemical Engineering, No. 201 "Development of a Method of Continuously Classifying Fine Particles Using Micro-Channel Layer Flow System" (Seki et al)

[Non-Patent Document 2] 69th-year Collection of Manuscripts of the Academic Circle of the Chemical Engineering, No. 202 "Discussion of Behavior in a Micro-Separation Classification Apparatus by Euler-Lagrange Method" (Ogawara et al)

SUMMARY OF THE INVENTION

The present invention aims at solving the above-described problems. Namely, the invention is to provide a method of separating and recovering larger particles and/or indeterminately shaped particles at a high separation and recovery efficiency with the particles in a dispersed liquid kept in a stable condition without causing the clogging and closure of a flow channel with contaminants and without causing contaminants, such as abrasion components to occur. Also the present invention is to provide a method of producing a particle-dispersed liquid from which larger particles and/or indeterminately shaped particles are separated and removed.

The present invention may provide a method of producing a particle-dispersed liquid, using a channel of micro width having a core flow channel including sending the particle-dispersed liquid containing larger particles to an inner portion of the core flow channel, separating and removing the larger particles from the particle-dispersed liquid, and sending the removed larger particles to an outermost part of the core flow channel, wherein an outer diameter of the core flow channel is 50 to 5,000 μm.

The present invention may provide a method of producing a particle-dispersed liquid, using a micro-channel having a core flow channel, including sending the particle-dispersed liquid containing indeterminately shaped particles to an inner portion of the core flow channel, separating and removing the indeterminately shaped particles from the particle-dispersed liquid, and sending the removed indeterminately shaped particles to an outermost part of the core flow channel, wherein an outer diameter of the core flow channel is 50 to 5,000 μm.

BRIEF DESCRIPTION OF THE DRAWINGS

These and other objects and advantages of this invention will become more fully apparent from the following detailed description taken with the accompanying drawings in which.

DETAILED DESCRIPTION OF THE INVENTION

The first method of producing a particle-dispersed liquid according to the present invention is a method of producing a particle-dispersed liquid, using micro-flow channels having a core flow channels, wherein the outer diameter of the outermost micro-flow channel is 50 to 5,000 μm, the method including the step of sending an indeterminately shaped particle-containing particle-dispersed liquid to a core flow channel on the inner side of the outermost core flow channel, and the step of separating and removing the indeterminately shaped particles from the particle-dispersed liquid and sending the resultant particles to the outermost core flow channel.

According to the present invention, the larger-diameter particles means components having larger particle diameters out of particles having particle diameter distribution, especially, particles the size of which is not smaller than 2.5 times as large as an average volume particle diameter Dv thereof.

In order to measure the volume average particle diameter in the present invention, a Coulter Counter, TA-II type, (manufactured by Beckman Coulter, Inc.) can be used. When this counter is used, measurement is conducted by using an optimum aperture depending upon the particle diameter level of the particles. The diameter of the measured particles is expressed by an average volume diameter.

When the diameter of the particles is not larger than about 5 μm, the measurement is conducted by using a laser diffraction scattering type particle size measuring apparatus (LA-700, manufactured by Horiba Ltd.). When particles cannot be taken out, 50 microscopic images thereof are arbitrarily selected, which are subjected to measurement, and this enables the calculation of the average volume diameter of the particles to be made.

A second method of producing a particle-dispersed-liquid according to the present invention is a method of producing a particle-dispersed liquid, using micro-flow passages having core flow channels, wherein the outer diameter of the outermost micro-flow channel is 50 to 5,000 μm, the method including the step of sending an indeterminately shaped particle-containing particle-dispersed liquid to a core flow channel on the inner side of the outermost core flow passages, and the step of separating and removing the indeterminately shaped particles from the particle-dispersed liquid and sending the resultant particles to the outermost core flow channel.

According to the present invention, the indeterminately shaped particles mean particles of which the form factor SF1 is 20 or more larger than the average form factor SF1 thereof.

The shape of the particles is defined by the form factor SF1. When this shape is close to a spherical shape, the form factor generally becomes 100 to 130, and, when the shape is indeterminate, the form factor exceeds 130. According to the present invention, the particles the form factor of which is 20 or more larger than the average form factor thereof can be efficiently separated. Moreover, the particles of which the form factor is larger by not smaller than 30 than the average form factor thereof can be more efficiently separated. The SF1 is defined as follows.

$$SF1 = \frac{(ML)^2}{A} \times \frac{\pi}{4} \times 100$$

wherein ML represents an absolute maximum length of the particles; and A represents a projected area thereof.

These absolute maximum length and projected area of the particles are digitized through an analysis of mainly a microscopic image or a scanning electron microscopic image by means of a Luzex image analyzer (manufactured by Nireco Company).

The inventors of the present invention discovered that, when larger particles existed in a particle-dispersed liquid or when indeterminately shaped particles existed therein, the particle-dispersed liquid was preferably sent to the channel on the inner side of the outermost core flow channels, and that the larger particles or indeterminately shaped particles were then separated and sent to the outermost core flow channel. The inventors further discovered that, when the particle-dispersed liquid was then taken out in a subsequent recovery unit from a recovery port the diameter of which is substantially equal to that of the port from which the particle-dispersed liquid was sent with the particle-dispersed liquid in the outermost channel taken from another recovery port, and that the larger particles and indeterminately shaped particles could be separated continuously with a high accuracy. It was discovered that a particle-dispersed liquid from which the larger particles and/or indeterminately shaped particles were removed in this manner could be produced.

It is generally known that, when a fluid is made to flow in a flow channel, a velocity gradient in which the velocity of flow of the liquid in the vicinity of a wall surface becomes substantially zero, and highest in the center of the channel, and that the velocity gradient in the core flow channel becomes larger. In the present invention, these phenomena are applied to the separation of larger particles and indeterminately shaped particles, and the inventors discovered that these particles could be separated and removed from the particle-dispersed liquid with a high accuracy. Especially, the separation and removal of the indeterminately shaped particles, which could not be carried out in a related art method of this kind, have become possible to be carried out by the present invention.

When the particles are larger particles or have more indeterminate shapes, if not large, a sectional velocity of flow gradient perpendicular to the direction of the flow of the particles occurs in the core flow channels, so that the particles rotate. Therefore, it is considered that a force by which the particles move in the direction in which the velocity of flow is low occurs, and that the larger particles and indeterminately shaped particles move toward the wall surface. When a recovery port of the flow channels of the particle-dispersed liquid is provided on the downstream side of the flow of the particles, a particle-dispersed liquid from which the larger particles or indeterminately shaped particles have been separated therefrom can be recovered.

In the present invention, let Dv denote the volume average diameter of the particles in the particle-dispersed liquid, the Dv is preferably 0.1 µm to 1,000 µm, more preferably 0.1 µm to 500 µm, further more preferably 0.1 µm to 200 and, especially preferably 0.5 µm to 50 µm.

When the volume average particle diameter of the particles is within these ranges, the influence of diffusion rarely occur, and the closure of the flow channels do not occur, so that preferable results are obtained.

Figure 1:
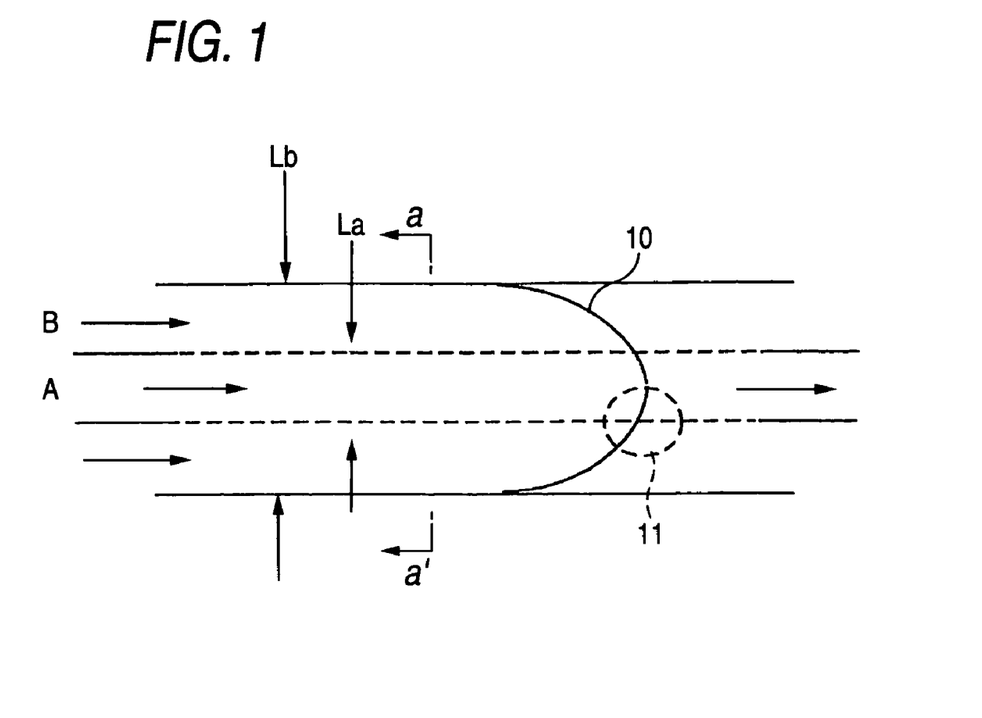
FIG. 1 is an example of a conceptual drawing of a micro-channel capable of being used for the method of a particle-dispersed liquid according to the present invention.

FIG. 1 shows an example of a conceptual diagram of micro-channel usable in the producing method according to the present invention.

Figure 2:
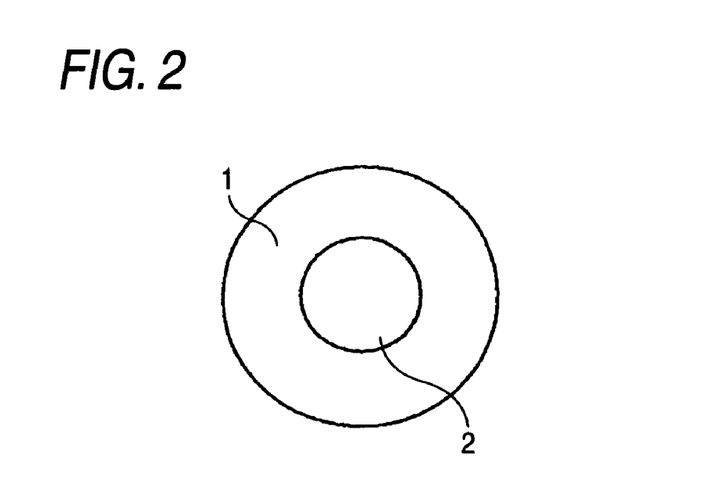
FIG. 2 is a conceptual drawing in section of the micro-channel of FIG. 1.

In the present invention, at least two concentric flow channels are formed in the micro-flow passage. FIG. 1 is a conceptual diagram of a micro-flow passage in which two concentric flow channels are formed to separate larger particles and/or indeterminately shaped particles are separated. FIG. 2 is a conceptual diagram of the micro-channel taken along a cross section a-a' in FIG. 1.

The micro-flow channel is provided with the outermost concentric flow channel 1, and a flow channel 2 on the inner side of the outermost channel 1. In the flow channel on the inner side of the outermost channel, a particle-dispersed liquid A is supplied, and, in the outermost core channel, a larger particle and/or indeterminately-shaped particle-recovered fluid B (which will hereinafter be referred to as "recovered fluid B" as well).

The velocity gradient 10 is conceptually shown in FIG. 1. In the concentric flow, it is shown that the velocity of flow of the core portion is high, and that the velocity of flow lowers concentrically toward a wall surface portion.

In an interface portion 11 of the particle-dispersed liquid and recovered fluid, it is considered that a force occurs by which the larger particles and indeterminately shaped particles are moved in the direction in which the velocity of flow is low, and that the larger particles and indeterminately shaped particles are moved toward the wall surface.

The outer diameter Lb of the outermost core flow channel is 50 to 5,000 µm, preferably 100 to 2000 µm, and more preferably 200 to 1,000 µm. When the outer diameter of the outermost core flow channel is smaller than 50 µm, the closure and the like thereof occurs. When this outer diameter exceeds 5,000 µm, a laminar flow is not stabilized, though it depends upon the velocity of flow, to cause problems to occur.

The particle-dispersed liquid is supplied to the inner core flow channel rather than to the outermost core flow channel.

The diameter La of the particle-dispersed liquid flow channel can be set freely in the range of smaller than Lb. However, when the diameter La of the particle-dispersed liquid flow channel is smaller than 10 times of the volume average diameter of the particles, the problem of the closure of the micro-flow channel may occur. On the other hand, when the diameter exceeds 4000 times as large as the volume average diameter of the particles, separation performance of the particles reduces at a center portion of the channel flow. Therefore, it is preferable that the diameter La of the particle-dispersed liquid flow channel is set to 10 to 4000 times larger than the volume average diameter of the particles contained in the particle-dispersed liquid. The diameter La is set more preferably to 30 to 4000 times larger than the volume average diameter, and further preferably 50 to 4000 times larger than the volume average diameter.

The diameter La of the particle dispersed liquid flow passage can be determined on the basis of the observation using a microscope.

When the micro-flow channel has not smaller than 3 laminar flows, the particle-dispersed liquid can be supplied to any of the layers on the inner side of the outermost core flow channel. It is preferable that the mentioned liquid be supplied from the outermost core flow channel to the adjacently inner side flow channel.

When the micro-channel has not smaller than 3 laminar flows, a core flow channel further exists in some cases on the inner side of the layer to which the particle-dispersed liquid is supplied. In this case, the above-mentioned La means the thickness of the layer to which the particle-dispersed liquid is supplied.

The velocity of flow in the micro-passage is preferably 1 mm/s to 1,000 mm/s, and more preferably 10 mm/s to 100 mm/s. When the velocity of flow is within these ranges, the practicality thereof is high, and the laminar flow is stable, so that velocity of flow is preferable.

The velocity of flow can be determined by making calculation on the basis of the flow rate and diameter of the flow passage.

In the producing method according to the present invention, a particle producing apparatus to be described below can be used.

The producing apparatus capable of being used in the present invention can be taken as an example an apparatus for producing a particle-dispersed liquid from which larger particles and/or indeterminately shaped particles have been separated and removed, the apparatus including a micro-channel having an introduction port into which the particle-dispersed liquid and a recovery liquid are introduced, a separation unit, a discharge port, and a recovery port for recovering separated larger particles and/or indeterminately formed particles. It is preferable that the particle-dispersed liquid introduction port be positioned on the upper side of the separation unit with respect to the gravitational direction, and that the recovery port be positioned on the lower side of the separation unit with respect to the gravitational direction. Positioning the introduction port and recovery port in this manner enables the flow passages to be stabilized, and is therefore, preferable.

In addition, when an angle between the flow channel and a direction of gravitational or buoyant force exceeds 45 degrees, the separation or discharge of the particles may not be sufficiently carried out due to sedimentation or floatation of the particles. Therefore, it is preferable to set the angle in a range of 0 to 45 degrees.

The apparatus preferably used in the present invention is a micro-reactor, which has a plurality of micro-scale channels, for example, channels of a width of several to several thousand µm.

The channels in the micro-reactor is micro-scales, so that both the dimensions and a velocity of flow are small, and a Reynold's number is not larger than 2,300. Therefore, the apparatus having channels of micro-scale is not turbulent flow dominant just as a regular apparatus but a laminar layer dominant.

The Reynold's number (Re) is defined by the following equation.

$$Re = uL/v$$

(u: velocity of flow, L: representative length, v: coefficient of kinetic viscosity)

Figure 3:
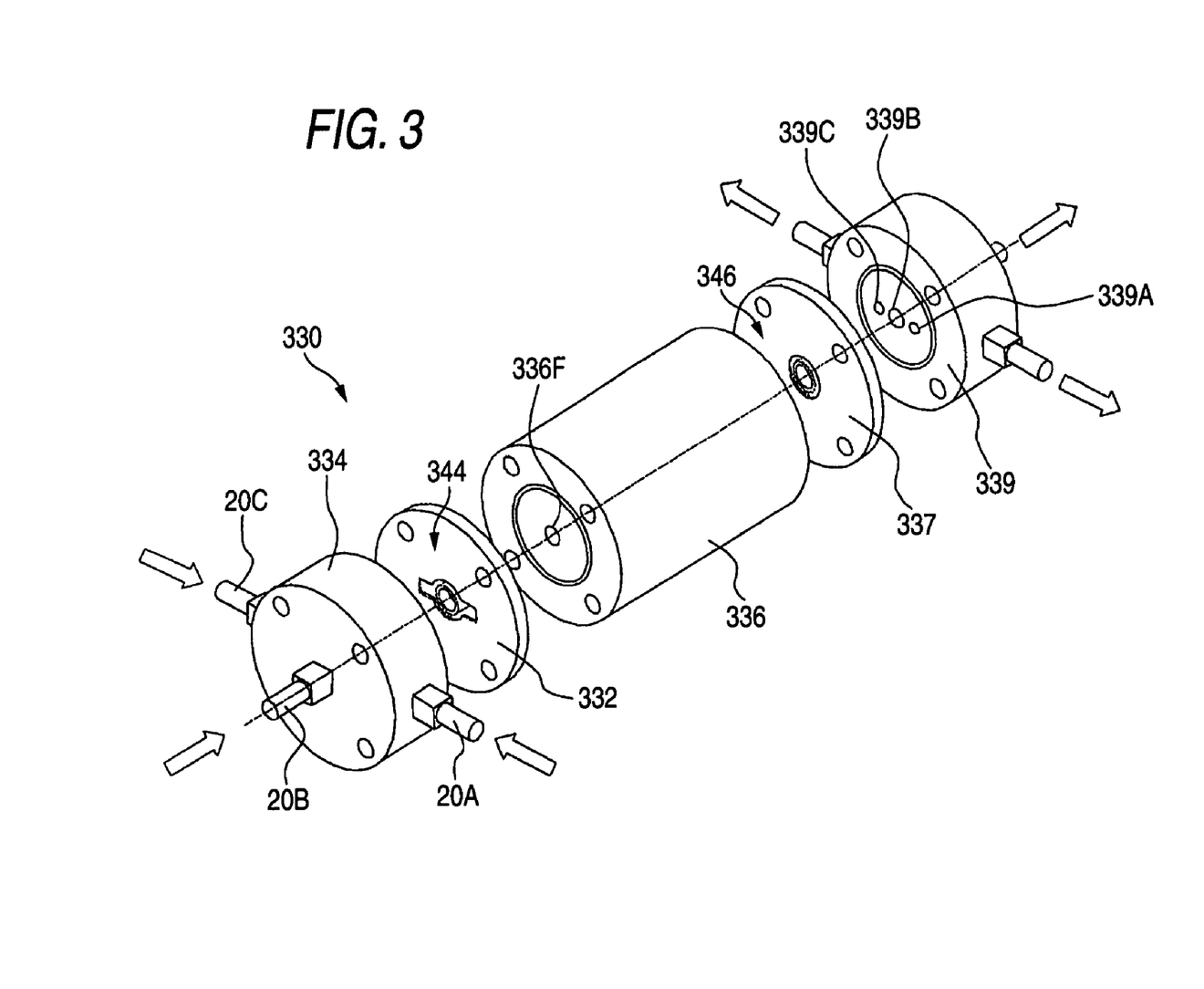
FIG. 3 is an exploded view in perspective making a sketch of a first mode of embodiment of the producing apparatus capable of being used in the present invention.
Figure 4:
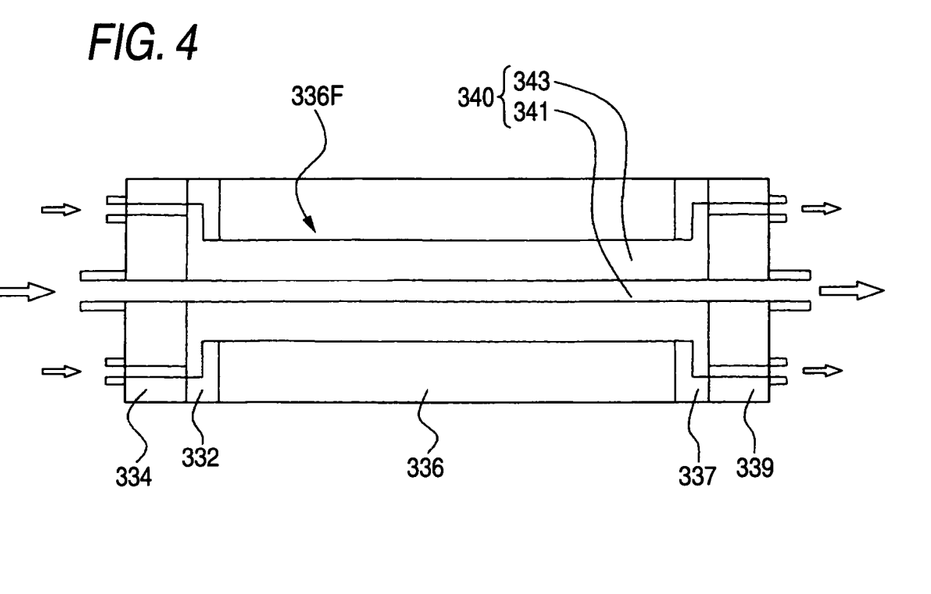
FIG. 4 is a schematic sectioned side elevation showing the mixing and separation of three liquids in the producing apparatus of FIG. 3.

An example of the particle-dispersed liquid producing apparatus capable of being used in the present invention will be described by using FIG. 3 to FIG. 4. FIG. 3 is a development in perspective, a sketch of one mode of embodiment of the producing apparatus capable of being used in the present invention. FIG. 4 is a schematic sectioned side elevation showing three liquids mixed and separated in the producing apparatus shown in FIG. 3.

FIGS. 3 and 4 show a micro-reactor 330 constituting an apparatus for producing a particle-dispersed liquid, capable of being used in the present invention. The micro-reactor is a micro-reactor having channels of a width of several to several thousand μm as mentioned above. In the embodiment of FIG. 3, 3 liquids are set to a concentric laminar arrangement, to thereby form a 2-layer core flow channel.

The 2-layer core flow channel is formed so that the diameter of the channel satisfies the La, Lb mentioned above.

The micro-reactor 330 is provided with a first plate (core flow setting unit) 332 (refer to FIG. 5 as well), and a first cover member 334 and a mixing channel member (fluid mixing unit) 336 which are provided on the upstream side and downstream side respectively of the first plate 332 so as to sandwich the first plate 332 therebetween. The first plate 332 and first cover member 334 are formed detachably with respect to the micro-reactor.

The core flow setting unit is adapted to send out the injected fluids as core flows the number of which corresponds to that of the kinds thereof. The shape of discharge ports of the core flow setting unit is not specially limited. Any shape of the discharge ports that permit outflow fluids to be set to core flow can be selected.

The fluids flowing into the core flow setting unit 332 flow out there from concentrically, and flow into the fluid mixing unit 336, in which the fluids are mixed. During this time, a flow rate, a velocity of flow, a fluid concentration and so forth of the fluids made to flow into the core flow setting unit are regulated, and the fluids are made to flow out concentrically as laminar flows.

On the upstream side of the first cover member 334, three in flow pipes (introduction unit) 20A, 20B, and 20C are provided. The first plate 332 is provided with a first fine channel 344 for turning the fluid flowing out from the pipes 20A to 20C into concentric layers.

The particle-dispersed liquid A is introduced from the pipe 20B, and larger particles and/or indeterminately shaped particle recovery fluid B (which will hereinafter be referred to as a recovery fluid as well) into the pipe 20A or 20C.

It is preferable that the introduction of the particle-dispersed liquid A and the recovery fluid B be done under pressure by a micro-syringe, a rotary pump, a screw pump, a centrifugal pump and a piezo-pump and so forth.

Figure 5:
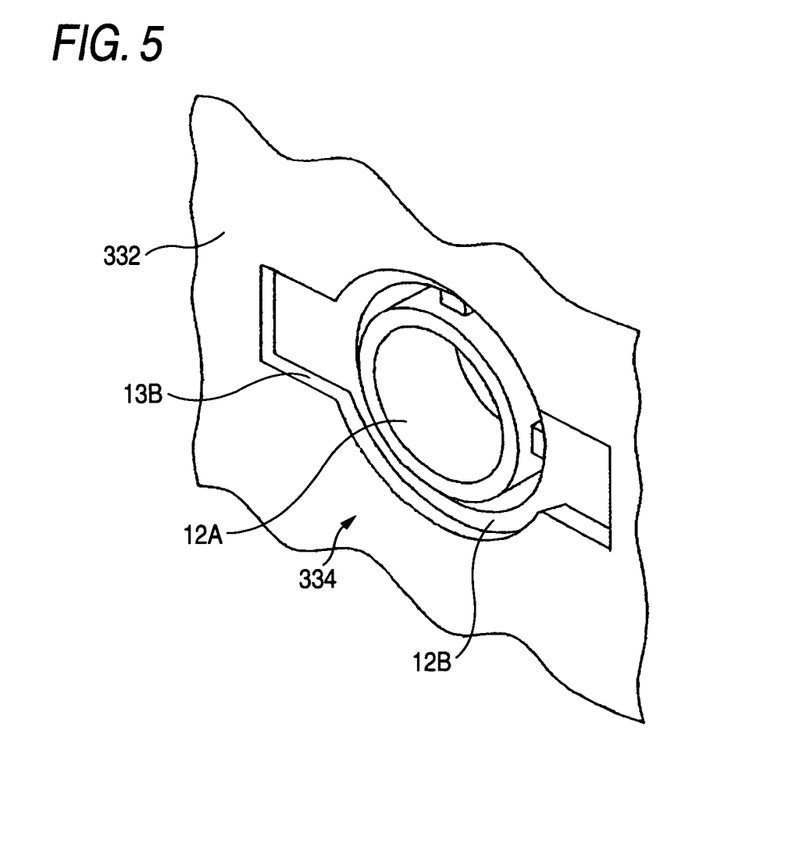
FIG. 5 is a partial perspective view showing the inflow side of a first plate constituting the producing apparatus of FIG. 3.

FIG. 5 is a partial perspective view showing an inflow side of the first plate constituting the producing apparatus of FIG. 3. As shown in FIG. 5, the first plate 332 is provided with a through hole 12A extending from the first cover member and through the same plate. The inner diameter of the through hole 12A is determined so that the fluid flows as a laminar flow (i.e., the Reynold's number becomes not larger than 2300) in the through hole 12A. The through hole of the first cover member and that of the plate 12A are formed to the same diameter so that a difference in level does not occur between the through hole of the first cover member and that 12A of the plate.

Around the through hole 12A of the first plate, a cylindrical slit through hole 12B is provided. The fluids sent from the introduction units 20A, 20C flow into the cylindrical slit through hole 12B via a radial channel 13B.

The mixing channel member 336 is provided with a mixing channel 336F adapted to simultaneously send two liquids flowing out from the first fine channel 344, and the separation of the larger particles and/or indeterminately shaped particles in the particle-dispersed liquid progresses as the two liquids flowing out from the first fine channel 344 keep the core laminar flows.

The micro-reactor 330 is further provided with a second plate (diversion unit) 337 (refer to FIG. 6 as well) disposed on the downstream side of the mixing channel member 336, and a second cover member 339 sandwiching the second plate 337 between the mixing channel member 336 and the second cover member 339. The second plate 337 and second cover member 339 are formed so as to be detachable with respect to the micro-reactor 330.

Referring to FIGS. 3 and 4, the second plate 337 is provided with a second fine channel 346 for separating and taking out a core side fluid 341 flowing on the channel core side and the outermost core side fluid 343 out of the fluids flowing out from the mixing channel 336F as a laminar core current 340. The second cover member 339 is provided with outflow channels 339A, B, and C for sending out the core side fluid 341 and the outermost core current fluid 343 are sent out respectively.

The particle-dispersed liquid discharged from 339B is a liquid from which the larger particles and/or indeterminately shaped particles have been separated and removed. The separated larger particles and/or indeterminately shaped particles are discharged from the outflow channel 339A or 339C.

Figure 6:
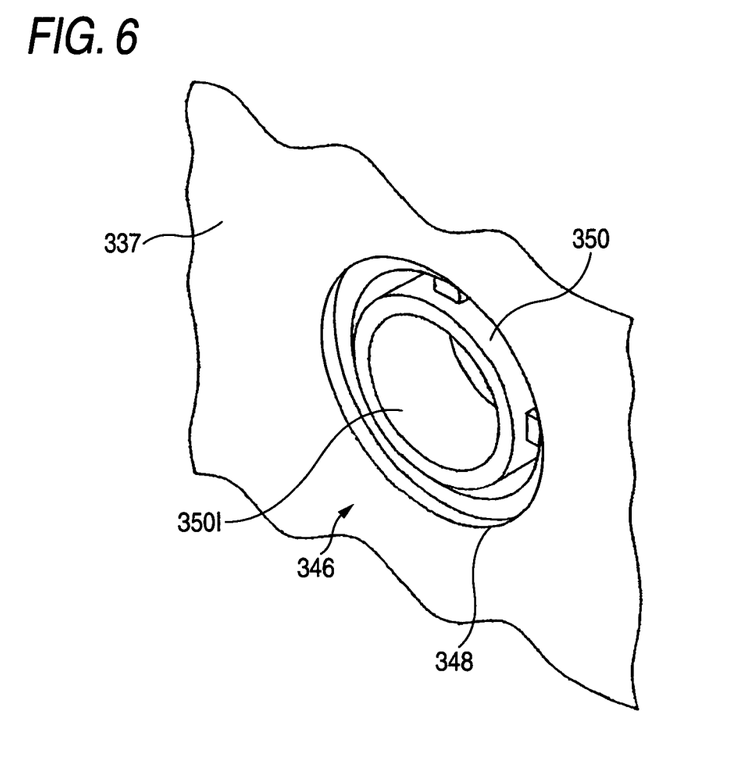
FIG. 6 is a partial perspective view showing the inflow side of a second plate constituting the producing apparatus of FIG. 3.

FIG. 6 is a partial perspective view showing the inflow side of the second plate constituting the producing apparatus of FIG. 3. In order to form the second fine channel 346, the second plate 337 is provided as shown in FIG. 6 with an inflow port 348 into which a laminar core flow 340 moves freely, and an extraction partition plate unit 350 having a ring type extraction port 3501 in this inflow port 348.

A combination of the second cover member 339 and second plate 337 is of a specular surface symmetric type (symmetry of plane) with respect to a combination of the first plate 332 and cover member 334. This enables the three liquids to be formed to two concentric laminar flows, and the concentric laminar flows 340 which have passed through the mixing channel 336F to be separated into three liquids.

It is preferable that the diameter (inner diameter of the extraction partition plate unit 350) of the central hole of the second plate 337 be set substantially equal to that of the central hole of the first plate 332. When the diameter of the central hole of the second plate is set slightly larger than that of the central hole of the first plate, a separation and recovery rate of the particles obtained from the core side fluid 341 constituting a material to be extracted can be improved. When the diameter of the central hole of the second plate 337 is set slightly smaller than that of the central hole of the first plate 332, the particle size distribution of the particles obtained from the core side fluid 341 can be rendered sharper and particles having low contents of larger particles and indeterminately shaped particles can be obtained.

Figure 7:
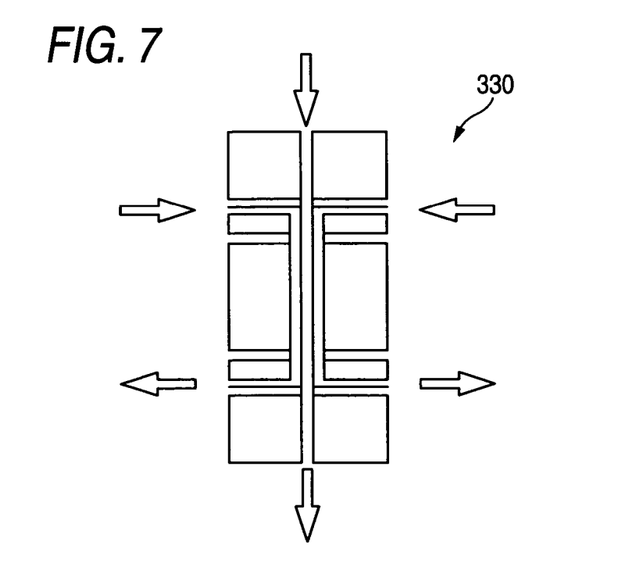
FIG. 7 is a schematic diagram showing a producing apparatus disposed vertically, and can be used in the present invention.

FIG. 7 is a schematic diagram showing a producing apparatus which is capable of being used in the present invention, and which is disposed vertically. An example in which the micro-reactor 330 is provided so that the mixing channel 336F extends horizontally is shown in FIG. 4. When the micro-reactor 330 is provided so that the mixing channel 336F extends vertically as shown in FIG. 7, the disorder of the laminar concentric flows due to the gravity can be inhibited. As a result, when fluids of which the gravity is greatly different are used, or when the dispersed particles are large, laminar concentric flows can be stably formed.

In this mode of embodiment, the first cover member 334, first plate 332, mixing channel member 336, second plate and second cover member 339 are joined together by screws, and a liquid leakage preventing O-ring is used. The assembling method is not limited to this, and a direct connecting method utilizing an intermolecular force of the surfaces of mutual members can also be used. When the direct connecting method is utilized, a structure not using an O-ring can be formed, so that this structure becomes able of be applied to even a fluid which corrodes a rubber material. Furthermore, when argon ion beam and the like are applied to the members under vacuum so as to wash the surfaces of the members at the atomic level with the normal temperature direct connection (surface activation connection techniques) in which the members are connected under pressure at normal temperature utilized, it becomes possible to hold down the influence of the thermal deformation of the members. The normal temperature direct connection techniques are effective in inhibiting the occurrence of thermal stress, which is ascribed to the difference in the linear expansion coefficients of the members, when the first plate 332 and first cover member 334 are made of different materials, and when the second plate 337 and second cover member 339 are made of different materials.

In this mode of embodiment, the first plate is adapted to turn the laminar flow of 3 liquids into 2-layer concentric currents. When the first fine channel 344 of the first plate 332 is selected suitably, the laminar flow of 3 liquids can also be turned into 3-layer concentric flows. Similarly, when the second fine channel 346 of the second plate 337 is selected suitably, the 3-layer concentric flow can also be separated.

Figure 8:
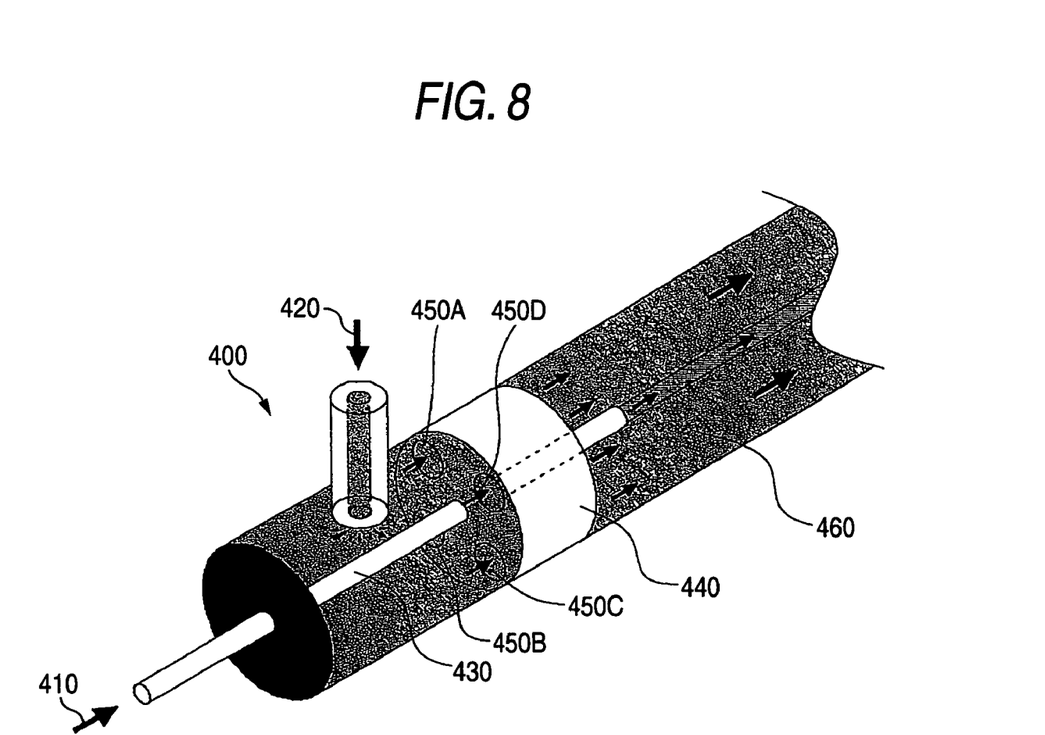
FIG. 8 is a schematic perspective view of another mode of embodiment of the producing apparatus capable of being used in the present invention.

FIG. 8 is a development in perspective, a sketch of another mode of embodiment of the producing apparatus capable of being used in the present invention. FIG. 8 shows from the fluid introduction unit to the mixing channel member. The producing apparatus shown in FIG. 8 is capable of turning 2 sent liquids into 2-layer concentric flows conveniently.

The producing apparatus (micro-rector) 400 has a pipe (introduction pipe) 410 for introducing a particle-dispersed liquid, and a pipe (introduction unit) 420 for introducing a recovery fluid into the micro-reactor.

The pipe 410 for introducing the particle-dispersed liquid into the micro-reactor is directly connected to the cylindrical through pipe 430, which extends through the first plate (concentric flow setting unit) 440. The recovery fluid introduced by the pipe 420 into the micro-reactor is sent to the mixing channel member (liquid mixing unit) 460 through the fluid sending holes 450A, B, C, and D provided in the first plate.

In the producing apparatus shown in FIG. 8, the construction of the first plate is simple, and can be formed by a small number of members.

The materials of which the producing apparatus according to the present invention can be formed are a metal, a ceramic material, a plastic material, glass and the like which are generally used, and these materials are preferably selected in a suitable manner in accordance with a medium liquid to be sent into the micro-reactor.

The particle-dispersed liquid used in the present invention will be described.

As long as the particle-dispersed liquid contains particles dispersed in the medium liquid, the medium liquid and particles of any specific gravity can be used. It is preferable that the particles be dispersed in the medium liquid with the specific gravity of the particles 0.87 to 21 times as large as that of the medium liquid, and more preferably 1.01 to 21 times as large as that of the medium liquid.

The particles may be any of the resin particles, inorganic particles, metal particles, ceramic particles and the like. Paraffinic hydrocarbon, which is solid at room temperature, such as solid paraffin can also be used as a material for forming particles. Particles of any specific gravity can be used. For example, solid paraffin of specific gravity of about 0.9 and particles of polyethylene of specific gravity of 0.96 can also be used, and high molecular particles of specific gravity of not smaller than 1 can also be used.

The kinds of the particles capable of being used in this invention are what are enumerated below but are not limited to these. For example, the particles include high molecular particles, crystals or aggregates of organisms, such as pigments, crystals or aggregates of inorganic substances, metal particles, or particles of metal compounds, such as metal oxides, metal sulfides and metal nitrides.

The high molecular particles include concretely polyethylene, polyolefin, such as polypropylene, polyvinyl butyral resin, polyvinyl acetal resin, polyallylate resin, polycarbonate resin, polyester resin, phenoxy resin, polyvinyl chloride resin, polyvinylidene chloride resin, polyvinyl acetate resin, polystyrene resin, acrylic resin, methacrylic resin, styrene-acrylic resin, styrene-methacrylic resin, polyacrylamide resin, polyamide resin, polyvinyl pyridine resin, cellulose-based resin, polyurethane resin, epoxy resin, silicone resin, polyvinyl alcohol resin, casein, vinyl chloride-vinyl acetate copolymer, modified vinyl chloride-vinyl acetate copolymer, vinyl chloride-vinyl acetate-maleic-anhydride copolymer, styrene-butadiene copolymer, vinylidene chloride-acrylonitrile copolymer, styrene-alkyd resin, phenol-formaldehyde resin, etc.

The particles of metals or metal compounds include metals, such as carbon black, zinc, aluminum, copper, iron, nickel, chromium, titanium, or alloys thereof, such as metal oxides, such as $TiO_2$, $SnO_2$, $Sb_2O_3$, $In_2O_3$, ZnO, MgO, metal oxides, such as ion oxide and compounds thereof, metal nitrides, such as silicon nitride or particles of combinations thereof.

Although there are various methods of producing these particles, a method of making particles in a medium by a synthesis, and processing the particles as they is used in many cases. There are cases where particles are produced by mechanically pulverizing a massive substance with the particles then dispersed in a medium. In such a method, the massive substance is pulverized in a medium in many cases, and the pulverized products are processed as they are in such cases.

In order to process pulverized bodies (particles) produced by a dry type method, it is necessary that the pulverized bodies be dispersed in the medium in advance. The methods of dispersing dry pulverized bodies in a medium include a method using a sand mill, a colloid mill, an atoraita, a ball mill, a daino mill, a high-pressure homogenizer, a supersonic disperser, a coball mill, a roll mill and the like. It is preferable that this method be carried out under the condition that the primary particles are not pulverized by a dispersion operation.

The specific gravity of the particles is preferably 0.87 to 21 times as large as that of the medium liquid mentioned above, and more 1.01 to 21 times as large as that of the same liquid. This specific gravity is further preferably 1.05 to 12 times as large as that of the medium liquid, and specially preferably 1.05 to 5 times as large as that thereof. When the specific gravity of the particles is within these ranges, the separation of the larger particles and/or indeterminately shaped particles is carried out excellently, so that the specific gravity in these ranges is preferable.

In other words, the medium liquid is preferably a medium liquid having specific gravity of preferably 0.95 to 21 as large as that of the particles as mentioned above. The liquid medium is made of, for example, water, or a water-based medium, an organic solvent-based medium and the like, and preferably selected in a suitable manner.

The water mentioned above includes ion exchange water, distilled water, electrolytic ionic water and the like. The organic solvent-based water includes concretely methanol, ethanol, n-propanol, n-butanol, benzyl alcohol, methyl cellosolve, ethyl cellosolve, acetone, methyl ethyl ketone, cyclohexanon, methyl acetate, acetate n-butyl, dioxane, tetrahydrofuran, methylene chloride, chloroform, chlorobenzene, toluen, xylene etc. and a mixture of not smaller than 2 kinds of these substances.

A preferable medium liquid differs depending upon the kind of the particles. The preferable medium liquid for each kind of the particles are as follows. The medium liquids to be combined with the high molecular particles (generally, having specific gravity of about 0.87 to about 1.6) preferably include an organic solvent, such as a water-based medium liquid which does not melt the particles, alcohols, xylene etc., acid or alkali water etc.

The medium liquids to be combined with particles (generally having specific gravity of about 2 to about 10) of a metal or a metal compound preferably include water, an organic solvent, such as alcohols, xylene etc. or oils which does not damage a metal by oxidation and reduction.

More preferable combinations of particles with a medium liquid in the present invention include a combination of high molecular particles and a water-based medium, and a combination of a metal or a metal compound and a low-viscosity oil medium. Out of these combinations, the combination of high molecular particles and a water-based medium is specially preferable.

Preferable combinations of particles with a medium liquid include a combination of styrene-acrylic particles and a water-based medium, a combination of styrene-methacrylic particles and a water-based medium, and a combination of polyester-based particles and a water-based medium.

The content of the particles in the particle-dispersed liquid is preferably 0.1 to 60 vol. %, and more preferably 5 to 30 vol. %. When the content of the particles in the particle-dispersed liquid is lower than 0.1 vol. %, the recovery of the particles becomes a problem in some cases, and, when this content exceeds 60 vol. %, the possibility that the channel be clogged therewith becomes high in some cases.

The specific gravity of the particles can be measured by a vapor phase method (pyknometer method) using "Ultra-pyknometer 1000" manufactured by Yuasa-Ionics Co., Ltd.

The specific gravity of the medium liquid can be measured by using "Specific Gravity Measuring Kit AD-1653" manufactured by A & D Co., Ltd.

The recovered fluid is a fluid not containing particles. According to the present invention, it is preferable that the medium liquid and recovered fluid be the same liquid.

When the recovered fluid is different from the medium liquid, it is preferable the medium liquid be one of the medium liquids mentioned above as concrete examples.

The preferable mode of the specific gravity of the recover fluid with respect to the recovered fluid is identical with that of the medium liquid with the particles.

Embodiment 1

Particle-Dispersed-Liquid A1

The particle-dispersed-liquid A1 is 20 wt % water-dispersed liquid containing spherical (SF1=110) styrene-acryl-based resin particles [(composition: styrene-n-bytylacrylate copolymer (weight ratio of 70:30, specific gravity of 1.05)] of a volume average diameter of 6 μm, and contained larger particles of not smaller than 15 μm at 0.5 wt % with respect to the whole particles.

<Recovered Fluid>

The water is used as the recovering fluid.

The diameter Lb of the outermost core current channel is set to 500 μm, while the diameter La of the particle-dispersed channel is set to 250 μm. The velocity of flow is set to 15 mm/s. The length of the channel is set 300 mm, and the diameter of the recovery port for the particle-dispersed liquid to 250 μm. The sending of the liquid is done continuously for about 3 hours by using a micro-cylinder pump.

The quantity of the larger particles of the particle-dispersed liquid recovered from the recovery port is measured to find out that the quantity is substantially 0%, and ascertain that the larger particles have been recovered in the larger particle recovering liquid. The deposition of the particles in the channel, and the indication of the blockade of the channel are not observed. The recovery rate of the particles is very high, and the recovery efficiency thereof is substantially 100%.

Embodiment 2

In this embodiment, the sending of liquid is done in the same manner as in the embodiment 1 except that the particle-dispersed liquid A1 in the embodiment 1 is changed to the particle-dispersed liquid A2.

<Particle-Dispersed A2>

The particle-dispersed liquid A2 is a 20 wt % water-dispersion liquid containing spherical (SF1=110) styrene-acryl-based resin particles (composition: styrene-n-butyl acrylate copolymer (weight ratio of 70:30, specific gravity of 1.05)))) of a volume average diameter of 6 μm. This liquid has SF1=145, and contains 0.8 wt % of indeterminately shaped particles of a volume average particle diameter of about 6 μm with respect to the whole particles.

The content of the indeterminately shaped particles in the particle-dispersed liquid recovered from the particle-dispersed liquid recovery port is measured to find out that the content is substantially 0%. Furthermore, the indication of the deposition of particles in the channel and the closure of the channel is not observed. The recovery rate of the particles is also substantially 100%, so that the particle recovery efficiency is extremely high.

According to embodiments of the present invention, the larger particles in a particle-dispersed liquid can be separated and removed therefrom with a high accuracy. Furthermore, the indeterminately shaped particles in a particle-dispersed liquid can be separated and removed therefrom. These particle separating and removing operations can be carried out continuously.

According to embodiments of the present invention, the deposition of particles on a wall surface and the coagulation of the particles do not occur, so that the closure of the flow passages due to the particles do not occur. Therefore, larger particles and indeterminately shaped particles can be separated and removed from a particle-dispersed liquid with a high separation efficiency.

According to embodiments of the present invention, it is possible to produce with a high accuracy a particle-dispersed liquid from which larger particles and/or indeterminately shaped particles have been separated and removed.

What is claimed is:

1. A method of producing a particle-dispersed liquid, using a channel of micro width having a core flow channel, comprising:

sending the particle-dispersed liquid containing larger particles to an inner portion of the core flow channel;

separating and removing the larger particles from the particle-dispersed liquid based on an outward force resulting from a velocity gradient of the particle-dispersed liquid; and sending the removed larger particles to an outermost part of the core flow channel;

wherein the core flow channel is circular in cross-section, an outer diameter of the core flow channel is 50 to 5,000 μm, and wherein the larger particles have a 2.5 times larger diameter than a volume average diameter of the particles in the particle-dispersed liquid.

2. The method according to claim 1, wherein in the step of sending and removing, a core flow in the core flow channel is a laminar flow.

3. The method according to claim 1, wherein the core flow channel makes an angle in a range of 0 to 45 degrees to a direction of gravitational or buoyant force.

4. The method according to claim 1, wherein volume average diameter of the particles in the particle-dispersed liquid is in a range of 0.1 μm to 1,000 μm.

5. The method according to claim 1, wherein a velocity of flow at a sending liquid portion of the particle-dispersed liquid is in a range of 1 to 1000 mm per second.

6. The method according to claim 1, wherein a circular cross-section of the core flow channel is in a range of 10 to 4000 times as large as a volume average diameter of the particles in the particle-dispersed liquid.

7. The method according to claim 1, wherein a specific gravity of the particles is in a range of 0.87 to 21 times as large as that of a medium liquid of the particle-dispersed liquid.

8. The method according to claim 1, wherein a content of the particles in the particle-dispersed liquid is in a range of 0.1 to 60 vol. %.

9. A method of producing a particle-dispersed liquid, using a micro-channel having a core flow channel, comprising:

sending the particle-dispersed liquid containing indeterminately shaped particles to an inner portion of the core flow channel;

separating and removing the indeterminately shaped particles from the particle-dispersed liquid based on an outward force resulting from a velocity gradient of the particle-dispersed liquid; and sending the removed indeterminately shaped particles to an outermost part of the core flow channel;

wherein the core flow channel is circular in cross-section, an outer diameter of the core flow channel is 50 to 5,000 μm, and a form factor, $$SF1 = \frac{(ML)^2}{A} \times \frac{\pi}{4} \times 100$$

of the indeterminately shaped particles is 20 or more larger than an average form factor of the particles in the particle-dispersed liquid.

10. The method according to claim 9, wherein in the step of sending and removing, a core flow in the core flow channel is a laminar flow.

11. The method according to claim 9, wherein the core flow channel makes an angle in a range of 0 to 45 degrees to a direction of gravitational or buoyant force.

12. The method according to claim 9, wherein volume average diameter of the particles in the particle-dispersed liquid is in a range of 0.1 μm to 1,000 μm.

13. The method according to claim 9, wherein a velocity of flow at a sending liquid portion of the particle-dispersed liquid is in a range of 1 to 1000 mm per second.

14. The method according to claim 9, wherein a circular cross-section of the core flow channel is in a range of 10 to 4000 times as large as a volume average diameter of the particles in the particle-dispersed liquid.

15. The method according to claim 9, wherein a specific gravity of the particles is in a range of 0.87 to 21 times as large as that of a medium liquid of the particle-dispersed liquid.

16. The method according to claim 9, wherein a content of the particles in the particle-dispersed liquid is in a range of 0.1 to 60 vol. %.

* * * * *